(12) United States Patent
Hurwitz (10) Patent No.: US 8,272,351 B2
(45) Date of Patent: *Sep. 25, 2012

(54) PORTABLE WATER BOTTLE AND DISH ASSEMBLY FOR HUMANS AND PETS

(75) Inventor: Marni Markell Hurwitz, Far Hills, NJ (US)

(73) Assignee: I Did It Inc., Far Hills, NJ (US)

( * ) Notice: Subject to any disclaimer, the term of this patent is extended or adjusted under 35 U.S.C. 154(b) by 308 days.

This patent is subject to a terminal disclaimer.

(21) Appl. No.: 11/186,475

(22) Filed: Jul. 21, 2005

(65) Prior Publication Data

US 2007/0017450 A1    Jan. 25, 2007

(51) Int. Cl.
- *A01K 7/00* (2006.01)
- *B65D 21/00* (2006.01)
- *B65D 21/02* (2006.01)
- *B65D 23/12* (2006.01)

(52) U.S. Cl. .................. 119/74; 199/77; 215/6; 215/10; 215/386; 220/23.83; 220/23.86

(58) Field of Classification Search ............ 119/74, 119/77, 51.5; 215/386, 387, 395, DIG. 7, 215/6, 10; 220/574, 23.91, 23.87, 23.83, 220/23.86, 737; 206/217, 541, 546, 223

See application file for complete search history.

(56) References Cited

U.S. PATENT DOCUMENTS

| | | | | |
|---|---|---|---|---|
| 1,922,612 A * | 8/1933 | Barker | ........................ | 119/77 |
| 2,513,489 A * | 7/1950 | Jenkins | ...................... | 215/313 |
| 4,530,439 A | 7/1985 | Finnell | ...................... | 220/746 |
| 4,570,835 A * | 2/1986 | Criqui et al. | ................ | 224/414 |
| 5,094,363 A | 3/1992 | Monahan | ................... | 222/131 |
| 5,636,592 A * | 6/1997 | Wechsler | ................ | 119/52.1 |
| 5,687,783 A | 11/1997 | Finnegan | ................... | 141/364 |
| 5,738,039 A * | 4/1998 | Berman et al. | ............... | 119/77 |
| 5,799,811 A * | 9/1998 | Bruckner et al. | ............ | 215/386 |
| 5,809,935 A * | 9/1998 | Kolterman et al. | ............ | 119/74 |
| 5,884,582 A | 3/1999 | Duckworth | ............... | 119/61.56 |
| 5,947,056 A * | 9/1999 | Zarski | ...................... | 119/61.56 |
| 5,960,742 A * | 10/1999 | O'Rourke et al. | ............. | 119/74 |
| 5,992,702 A | 11/1999 | Shapiro | ...................... | 222/205 |
| 6,101,974 A | 8/2000 | Frohlich | .................... | 119/51.5 |
| 6,126,024 A * | 10/2000 | Ramirez et al. | ............ | 215/12.1 |
| 6,302,286 B1 * | 10/2001 | Witherspoon | ............... | 215/11.6 |
| 6,401,964 B1 | 6/2002 | Goto | ...................... | 220/592.27 |
| 6,405,675 B1 | 6/2002 | Mills | ........................ | 119/74 |
| 6,568,347 B2 * | 5/2003 | Ciguere | .................... | 119/61.56 |

(Continued)

*Primary Examiner* — Joseph W Sanderson (74) *Attorney, Agent, or Firm* — Ernest D. Buff, Esq.; Ernest D. Buff & Assoc. LLC; Margaret A. LaCroix, Esq.

(57) ABSTRACT

The present invention provides a portable water bottle and dish assembly and method for humans and pets to provide a human or pet with a readily accessible water bottle integrally attached to a delivery dish. The portable water bottle and dish assembly broadly comprises a bottle having a top portion and a body portion with an outer shell and an internal chamber that is removably attached and housed within a delivery dish. The delivery dish is configured in size and shape to provide access to a pet or human for drinking therefrom. Optionally, the bottle comprises an insulating internal chamber adapted to insulate the liquid housed therein, keeping the liquid at a constant temperature for a period of time. Alternatively, the delivery dish comprises an insulating interior compartment adapted to insulate the liquid when the bottle is within the interior compartment of the delivery dish.

7 Claims, 5 Drawing Sheets

U.S. PATENT DOCUMENTS

| | | | |
|---|---|---|---|
| 6,604,649 B1 | 8/2003 | Campi | 220/739 |
| 6,718,911 B2* | 4/2004 | Greenberg | 119/51.5 |
| 6,874,445 B2* | 4/2005 | Polimeni, Jr. | 119/74 |
| 6,971,331 B1* | 12/2005 | Rohrer | 119/77 |
| 6,971,562 B2* | 12/2005 | Willows et al. | 224/148.4 |
| 7,073,461 B2* | 7/2006 | Gonet | 119/61.5 |
| 7,108,157 B2* | 9/2006 | Alei | 222/153.06 |
| 7,287,487 B2* | 10/2007 | Hurwitz | 119/74 |
| 2004/0050959 A1* | 3/2004 | Mazooji et al. | 239/263.1 |
| 2004/0178208 A1* | 9/2004 | Leba et al. | 220/761 |
| 2004/0262252 A1* | 12/2004 | Hammer | 215/228 |
| 2006/0144861 A1* | 7/2006 | Harrison et al. | 222/173 |
| 2007/0079762 A1* | 4/2007 | Stephanos | 119/74 |

\* cited by examiner

Figure 4 ic orifice over the top portion of the bottle and a threaded member located on the inside surface of the receiving orifice screws onto an threaded portion affixed to the upper portion of the bottle and thereby securing the bottle into the interior compartment of the delivery dish.

PORTABLE WATER BOTTLE AND DISH ASSEMBLY FOR HUMANS AND PETS

BACKGROUND OF THE INVENTION

1. Field of the Invention

The present invention relates to a portable water bottle and dish assembly for humans and pets; and more particularly, to a water bottle having a delivery dish removably attached thereto, the water bottle and/or the delivery dish being insulated, and thereby being especially well suited for use by humans and/or pets.

2. Description of the Prior Art

Outdoor activities, especially in hot temperatures, require adequate hydration of pets, as well as pet owners. It is oftentimes difficult to provide adequate hydration to a pet, as the pet owner must either carry a dish or bowl, or attempt to deliver the water to the pet by pouring the water from a bottle into the pet's mouth or onto the absorbent ground. It can be highly cumbersome and inconvenient to carry both a water bottle and a dish or bowl when performing outside activities, such as walking, jogging, or hiking. Water bottles heretofore disclosed and utilized for humans and pets fail to provide a convenient, efficient manner in providing portable water bottles having a dish in close proximate thereto. That is to say, none of the water bottles heretofore disclosed and utilized provide a portable assembly, wherein the water bottle is integrally housed within the water delivery dish so that the dish is conveniently available for providing optimal water consumption. Moreover, none of the water bottles heretofore disclosed and utilized provide an optional insulated water bottle or insulated water delivery dish so that the water housed within the bottle can maintain a constant temperature for a given period of time, thereby, for example, providing a thirst quenching cool drink on a hot summer day in the middle of a forest during a hike.

For example, U.S. Pat. No. 5,687,783 to Finnegan discloses an animal watering device and method for automatically supplying pets with water as a large water vessel is connected to a drinking vessel. U.S. Pat. No. 5,884,582 to Duckworth discloses pet feeder for holding food and/or water dish for pets, adapted to help keep pets from scattering their food or splattering their drink out of their dishes. Also, U.S. Pat. No. 6,101,974 to Frohlich discloses a combination pet water bottle and bowl broadly comprising a molded plastic vessel capable of retaining water having a flat wall and a second wall having a bowl depression therein. However, none of these water delivery apparatuses can feasibly provide hydration while doing activities, as the water bottle and bowl combinations are not conceivably portable as the apparatuses would be too bulky and cumbersome to carry while walking. Moreover, the bowl portions are not integrally attached to the water bottle. None of these apparatuses provide for an insulated water bottle and dish assembly, and there is no indication that these apparatuses can be utilized by either a human or a pet. Lastly, none of these apparatuses can optionally include an attachment clip adapted to be attached to the waist of a person for easy transportability.

Even where portable water bottles having a delivery device, in the way of a cup or the like, have been heretofore disclosed and utilized, these portable water bottles fail to provide a water bottle integrally housed within an interior compartment of a dish or bowl so that the apparatus is compact in nature for effortless portability. For example, U.S. Pat. No. 4,530,439 to Finnell discloses a thermos bottle cap that doubles as a cup. While, U.S. Pat. No. 5,992,702 to Shapiro discloses a water bottle for pets and their owners broadly comprising a liquid container with a lid assembly having an opening through which a flexible tube extends and provides liquid to a liquid reservoir located on the top of the apparatus so that a pet can drink there from. In addition, U.S. Pat. No. 6,405,675 to Mills discloses a water bottle assembly having a removable water bowl for providing a receptacle for watering a pet while outdoors, broadly comprising a bottle, lid, and a bowl removably coupled to the water bottle for carrying the water bottle and bowl as a single unit. None of these water bottles and cup or bowl assemblies provides a water bottle that is integrally housed within the interior compartment of the delivery bowl, rather theses water bottles apparatuses provide a bowl attached to the top part or bottom portion of a water bottle. The bottle does not rotate within the interstices of the dish, thereby providing a dish that has a configuration such as a trough so the pet can readily drink there from. Further, there is no indication that the bottle or dish is insulated to from a thermos to maintain and keep the temperature of the liquid constant for a period of time.

Although numerous insulated water bottles have been heretofore disclosed and utilized, none provide a water bottle integrally housed within the interior compartment of a delivery dish. Fore example, U.S. Pat. No. 5,094,363 to Monahan, et al., discloses an insulated water bottle adapted to be utilized for a bicycle. U.S. Pat. No. 6,604,649 to Campi discloses a container for the thermostatic preservation of liquids broadly comprising a shell having a cavity to accommodate a vessel which in turn houses a liquid container and encapsulates the liquid container with another top portion. Lastly, U.S. Pat. No. 6,401,964 to Goto, et al., discloses a portable insulating receptacle having an outer non-slip shell. None of these insulated water bottles provides a water bottle having a dish assembly wherein the water bottle is integrally housed within the interior compartment of the delivery bowl. In fact, these water bottles do not provide a receptacle for convenient delivery of the water/liquid to a human or pet so that the pet can readily drink there from.

Significantly, none of the water bottles heretofore disclosed and utilized provide a portable assembly, wherein the water bottle is integrally housed within the water delivery dish so that the dish is conveniently available for providing optimal water consumption. Moreover, none of the water bottles heretofore disclosed and utilized provide an optional insulated water bottle or insulated water delivery dish so that the water housed within the bottle can maintain a constant temperature for a given period of time, thereby, for example, providing a thirst quenching cool drink on a hot summer day in the middle of a forest during a hike.

The subject invention provides a portable water bottle and dish assembly for humans and pets. The portable water bottle and dish assembly comprises a bottle removably housed within a delivery dish. The bottle includes a top portion equipped with an aperture and a body portion having an outer shell and an internal chamber appointed for receiving and housing a liquid therein. The delivery dish has an external casing and an interior compartment adapted to receive and removably house the bottle containing liquid. The delivery dish is further adapted to receive and contain the liquid so that the human and/or the pet can drink from the delivery dish after the bottle is removed there from. The interior compartment of the delivery dish comprises a cap receiving member having a receiving orifice. The cap receiving member is pivotally connected to a pivot means so that the cap receiving member is adapted to rotate or pivot back and forth. The cap receiving member is further adapted to removably connect to the top portion of the bottle when the bottle is attached to the delivery dish. After attachment, the pivot means rotates the cap receiving member and visa vie the bottle so that the body portion of the bottle is housed within the interior compartment of the delivery dish.

For the foregoing reasons, there exists a need in the art for a portable water bottle and dish assembly and method for humans and pets that provides a human or pet with a readily accessible water bottle integrally attached to a delivery dish. Also needed in the art is a portable water bottle and dish assembly that broadly comprises a bottle having a top portion and a body portion with an outer shell and an internal chamber that is removably attached and housed within a delivery dish. It would further be desirable if the delivery dish were configured in size and shape to provide access to a pet or human for drinking therefrom, and the bottle comprised an insulating internal chamber adapted to insulate the liquid housed therein, keeping the liquid at a constant temperature for a period of time. Also desirable, yet heretofore not available, is a delivery dish comprising an insulating interior compartment adapted to insulate the liquid when the bottle is within the interior compartment of the delivery dish.

SUMMARY OF THE INVENTION

The present invention provides a portable water bottle and dish assembly for humans and pets. The portable water bottle and dish assembly comprises a bottle removably housed within a delivery dish. The bottle includes a top portion equipped with an aperture and a body portion having an outer shell and an internal chamber appointed for receiving and housing a liquid. The delivery dish has an external casing and an interior compartment adapted to receive and removably house the bottle containing liquid. The delivery dish is further adapted to receive and contain the liquid so that the human and/or the pet can drink from the delivery dish after the bottle is removed therefrom. The interior compartment of the delivery dish comprises a cap receiving member having a receiving orifice. The cap receiving member is pivotally connected to a pivot means so that the cap receiving member is adapted to rotate or pivot back and forth. The cap receiving member is further adapted to removably connect to the top portion of the bottle when the bottle is attached to the delivery dish. After attachment, the pivot means rotates the cap receiving member relative to the bottle so that the body portion of the bottle is housed within the interior compartment of the delivery dish.

The internal chamber of the bottle may be an insulating internal chamber adapted to insulate the liquid. Alternatively, the interior compartment of the delivery dish is an insulating interior compartment adapted to insulate the liquid housed in the bottle when the bottle is within the interior compartment of the delivery dish.

The body portion of the bottle may further comprise a locking portion adapted to secure the bottle in the interior compartment of the delivery dish. The locking portion comprises at least one concave locking arc. In this embodiment, the interior compartment of the delivery dish may further comprise at least one convex securing member adapted to be received by the concave locking arc of the body portion of the bottle. The concave locking arc and the convex securing member act in concert to secure the bottle within the interior compartment of the delivery dish. In addition, the body portion of the bottle may further comprise a release tab adapted to be utilized to release the body portion of the bottle from the interior compartment of the delivery dish.

Optionally, the delivery dish further comprises a fastening member adapted to secure the bottle in the interior compartment of the delivery dish. The fastening member of the delivery dish may comprise a fastening strap having a fastening means. The fastening means may be selected from the group consisting of hook and clasp closure, snap closure, a loop closure, and VELCRO™ hook and loop type closure.

The top portion of the bottle may further comprises a pour spout removably surrounding the aperture and being adapted to seal the aperture of the bottle so that the liquid housed therein does not escape out of the bottle. The receiving orifice of the cap receiving member of the delivery dish is also adapted to removably receive and house the pour spout of the top portion of the bottle when the bottle is being housed within the delivery dish. Alternatively, the top portion of the bottle further comprises a bottle cap removably surrounding the aperture and being adapted to seal the aperture of the bottle so that the liquid housed therein does not escape out of the bottle. In this arrangement, the receiving orifice of the cap receiving member of the delivery dish is adapted to removably receive and house the bottle cap of the top portion of the bottle when the bottle is being housed within the delivery dish.

In another embodiment, the cap receiving member further comprises cap closure grooves located within the receiving orifice and the top portion of the bottle further comprises bottle top grooves fixedly surrounding the aperture. The cap closure grooves located within the receiving orifice are adapted to removably receive the bottle top grooves and seal the aperture of the bottle so that the liquid housed therein does not escape out of the bottle when the bottle is being housed within the delivery dish.

An attachment clip may be included in the assembly. The attachment clip is located on the external casing of the delivery dish. Also, the outer shell of the bottle may further comprise a grip portion appointed for providing comfort to the human when holding the bottle. This grip portion may comprise a plurality of contour curves and can be composed of foam, sponge, plastic, or rubber material.

The portable water bottle and dish assembly may include a second bottle adapted to be removably housed within the delivery dish and being appointed to accommodate interchangeability of the bottle with the second bottle. Like the main bottle, the second may have an insulated construction adapted to insulate liquid housed therein.

The present invention also provides a method of delivering water by way of a portable water bottle and dish assembly to a pet or human. The method includes the first step of filling a bottle with a liquid, wherein the bottle comprises a top portion with an aperture and a body portion having an outer shell and an internal chamber appointed for receiving and housing a liquid therein. Secondly, the top portion of the bottle is then placed within a receiving orifice of a cap receiving member found within an interior compartment of a delivery dish. The cap receiving member is pivotally connected to a pivot means adapted to rotate the cap receiving member and the bottle. The delivery dish further comprises an external casing. Thirdly, the bottle and the cap receiving member are rotated in an inward direction so that the body portion of the bottle is removably housed within the interior compartment of the delivery dish. Fourthly, the delivery dish and bottle assembly containing the liquid housed therein is carried until the pet or human experiences thirst. Fifthly, the body portion of the bottle is snapped out of the interior compartment of the delivery dish. Sixthly, the bottle and the cap receiving member are rotated in an outward direction so that the bottle is removed from the interior compartment of the delivery dish. Seventhly, the top portion of the bottle is removed from the receiving orifice of the cap receiving member of the delivery dish.

Finally, the liquid is poured into the interior compartment of the delivery dish so that the human and/or the pet can drink from the delivery dish.

In one aspect of the invention, the internal chamber of the bottle may be an insulating internal chamber adapted to insulate the liquid housed therein. In another aspect of the invention, the interior compartment of the delivery dish is an insulating interior compartment adapted to insulate the liquid housed in the bottle when the bottle is within the interior compartment of the delivery dish.

BRIEF DESCRIPTION OF THE DRAWINGS

The invention will be more fully understood and further advantages will become apparent when reference is had to the following detailed description, appended claims, and accompanying drawings, in which:

DESCRIPTION OF THE PREFERRED EMBODIMENTS

The arrangement provides for a portable water bottle and dish assembly for humans and pets. The portable water bottle and dish assembly comprises a bottle removably housed within a delivery dish. The water bottle is appointed with an attached dish that serves to protect the bottle during storage and at the same time provides a delivery means when utilized for drinking the water or liquid therein.

Figure 1:
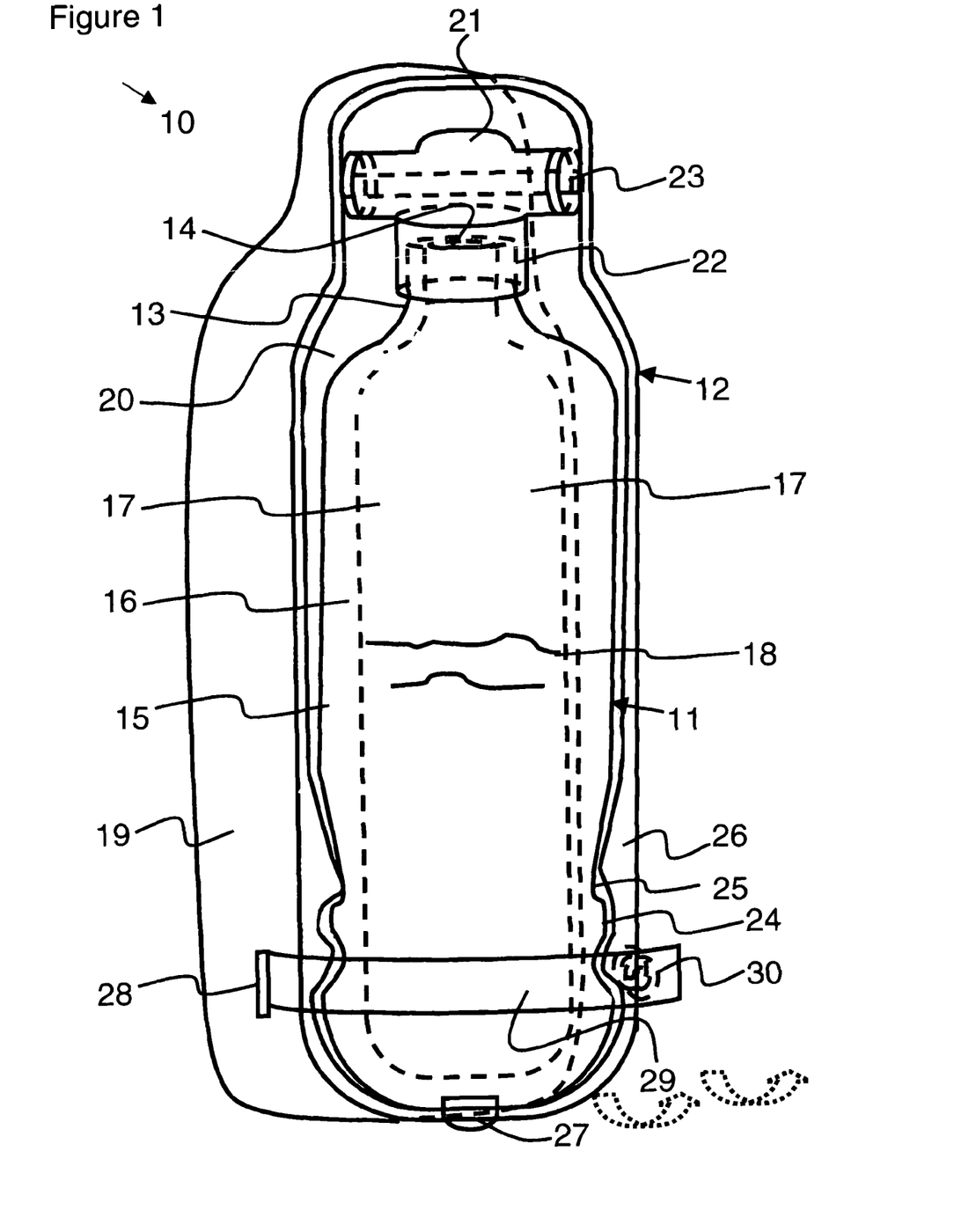
FIG. 1 is a schematic view of the Portable Water Bottle and Dish Assembly for Humans and Pets, showing the bottle housed within the interior compartment of the delivery dish, illustrating the front and side of the bottle housed within the delivery dish.

FIG. 1 is a schematic view of the Portable Water Bottle and Dish Assembly for Humans and Pets, showing the bottle housed within the interior compartment of the delivery dish, shown generally at 10. The portable water bottle and dish assembly comprises a bottle 11 removably housed within a delivery dish 12. The bottle 11 includes a top portion 13 equipped with an aperture 14. Bottle 11 further comprises a body portion 15 having an outer shell 16 and an internal chamber 17 appointed for receiving and housing a liquid 18 therein. The delivery dish 12 has an external casing 19 and an interior compartment 20 adapted to receive and removably house bottle 11 containing liquid 18.

Delivery dish 12 is further adapted to receive and contain liquid 18 so that a human and/or a pet can drink from the delivery dish 12 after bottle 11 is removed there from. The interior compartment 20 of delivery dish 12 comprises a cap receiving member 21 having a receiving orifice 22 therein. The cap receiving member 21 is pivotally connected to a pivot means 23 so that the cap receiving member 21 is adapted to rotate or pivot back in forth in an outward and inward direction as indicated by the phantom arrows. The cap receiving member 21 is further adapted to removably connect to top portion 13 of bottle 11 when bottle 11 is attached to delivery dish 12. After attachment, the pivot means 23 rotates cap receiving member 21 and visa vie bottle 11 so that the body portion 15 of bottle 11 is housed within interior compartment 20 of delivery dish 12.

The internal chamber 17 of bottle 11 may be an insulating internal chamber adapted to insulate liquid 18 housed therein. In this configuration, the internal chamber 17 of bottle 11 is an insulating internal chamber and the bottle 11 acts as a thermos for keeping liquids either hot or cold for several hours, generally having a liner, usually glass, made on the principle of the Dewar vessel. The outer shell 16 of body portion 15 of bottle 11 acts to encase and encapsulate the insulating internal chamber 17, thereby protecting it. The insulating internal chamber 17 insulates liquid 18 housed therein and maintains liquid 18 at its original temperature for a period of time.

Alternatively, the interior compartment 20 of delivery dish 12 is an insulating interior compartment. In this embodiment, the liquid 18 is insulated by the integral attachment of bottle 11 housed within delivery dish 12. That is to say, the insulating interior compartment 20 of delivery dish 12 acts to insulate liquid 18 housed in bottle 11 when bottle 11 is within the interior compartment 20 of delivery dish 12.

The body portion 15 of bottle 11 may further comprise a locking portion 24 adapted to secure bottle 11 in interior compartment 20 of delivery dish 12. Locking portion 24 comprises at least one concave locking arc 25. In this embodiment, interior compartment 20 of delivery dish 12 may further comprise at least one convex securing member 26 adapted to be received by concave locking arc 25 of body portion 15 of bottle 11. Concave locking arc 25 and convex securing member 26 act in concert to secure bottle 11 within interior compartment 20 of delivery dish 12. In addition, body portion 15 of bottle 11 may further comprise a release tab 27 adapted to be utilized to release body portion 16 of bottle 11 from interior compartment 20 of delivery dish 12.

Delivery dish 12 may further comprise a fastening member 28 adapted to secure bottle 11 in interior compartment 20 of delivery dish 12 so that bottle 11 does not fall out of delivery dish 12. Fastening member 28 of delivery dish 12 may comprise a fastening strap 29 having a fastening means 30. Fastening means 30 may be selected from the group consisting of hook and clasp closure, snap closure, a loop closure, and VELCRO™ hook and loop type closure. Fastening member 28 is shown herein at the base of delivery dish 12, but may be located anywhere on the external casing 19 of delivery dish 12.

Figure 2A:
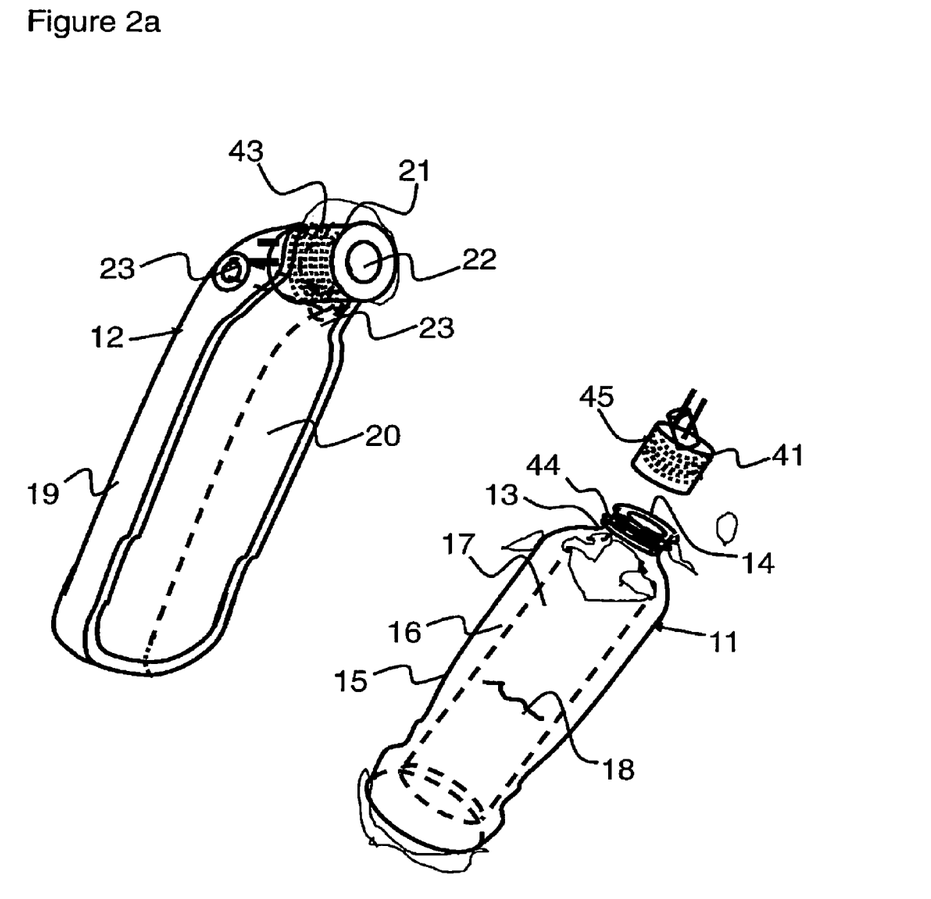
FIGS. 2a and 2b are schematic views of embodiments of the bottle and the delivery dish in the detached configuration, with FIG. 2a showing the bottle and delivery dish with a pour spout and FIG. 2b showing the bottle and delivery dish with a cap.
Figure 2B:
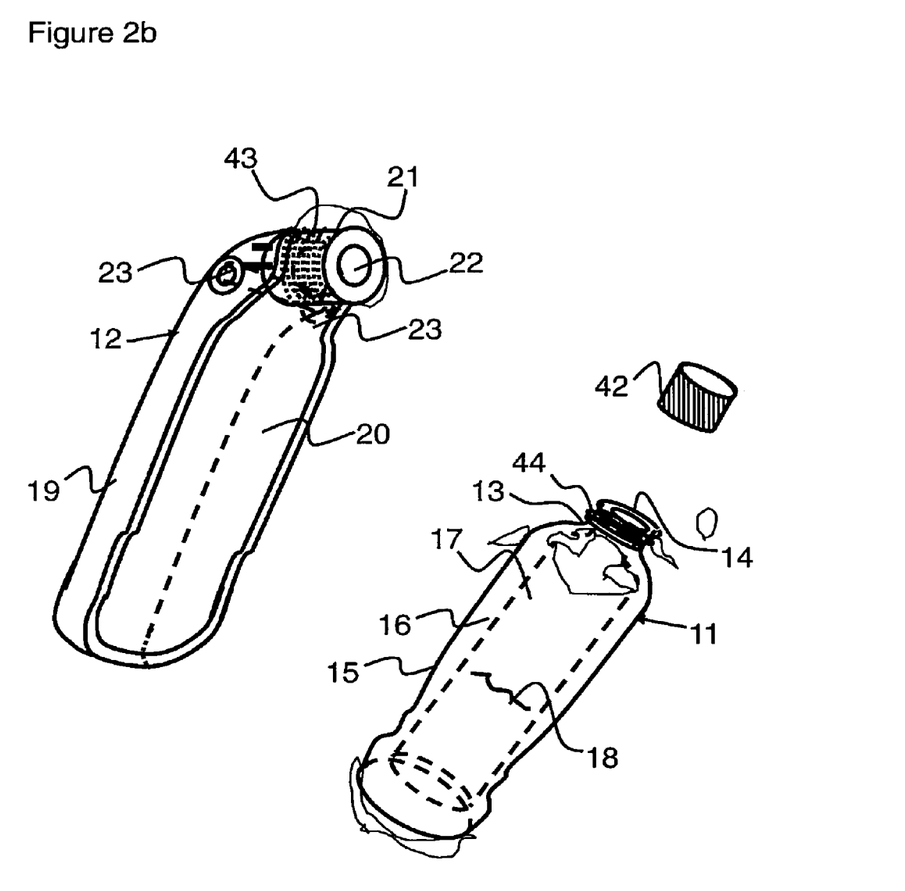

FIGS. 2a and 2b are schematic views of embodiments of the bottle and the delivery dish in the detached configuration. Bottle 11 is shown detached from delivery dish 12. Bottle 11 comprises top portion 13 with an aperture 14, and body portion 15 having an outer shell 16 and an internal chamber 17 appointed for receiving and housing liquid 18 therein. Delivery dish 12 comprises external casing 19 and interior compartment 20 adapted to receive and removably house bottle 11. Interior compartment 20 of delivery dish 12 comprises cap receiving member 21 having a receiving orifice 22 therein, and being pivotally connected to a pivot means 23 so that cap receiving member 21 can rotate or pivot back in forth in an outward and inward direction as indicated by the phantom arrows. Cap receiving member 21 is adapted to removably connect to top portion 13 of bottle 11.

This connection is accomplished in a number of embodiments. In one embodiment, shown in FIG. 2a, top portion 13 of bottle 11 comprises a pour spout 41 removably surrounding aperture 14 and being adapted to seal aperture 14 of bottle 11 so that liquid 18 housed therein does not escape out of bottle 11. The receiving orifice 22 of cap receiving member 21 of delivery dish 12 is also adapted to removably receive and house pour spout 41 of top portion 13 of bottle 11 when bottle 11 is being housed within delivery dish 12. Alternatively, in another embodiment, shown in FIG. 2b, top portion 13 of bottle 11 does not have a pour spout 41, but instead comprises a typical bottle cap, shown as 42. Like pour spout 41 alternative bottle cap 42 removably surrounds aperture 14 and is adapted to seal aperture 14 of bottle 11 so that liquid 18 housed therein does not escape out of bottle 11. In this arrangement, receiving orifice 22 of cap receiving member 21 of delivery dish 12 is adapted to removably receive and house bottle cap 42 of top portion 13 of bottle 11 when bottle 11 is being housed within delivery dish 12. Top portion 13 of bottle 11 further comprises bottle top grooves 44 fixedly surrounding aperture 13 so that pour spout 41 and/or bottle cap 42 can be twisted thereon for opening and closing bottle 11. Pour spout 41 may further have grooves 45 therein.

In another embodiment, cap receiving member 21 further comprises cap closure grooves 43 located within receiving orifice 22 and top portion 13 of bottle 11 further comprises bottle top grooves 44 fixedly surrounding aperture 13. The cap closure grooves 33 are located within receiving orifice 22 and are adapted to removably receive bottle top grooves 44 and seal aperture 14 of bottle 11 so that liquid 18 housed therein does not escape out of bottle 11 when bottle 11 is being housed within delivery dish 12. In this arrangement, bottle 11 is open when cap receiving member 21 is removed from top portion 13 via delivery dish 12 is attached to the bottle 11 by way of a screw top closure or snap top closure. This top closure prevents leakage of the liquid housed within the bottle. When the top closure (41, 42 or 43) is removed from bottle 11, liquid 18 housed within bottle 11 can be poured into delivery dish 12. The delivery dish 12 does not leak, and provides a dish or trough for which a human or an animal may drink.

Figure 3:
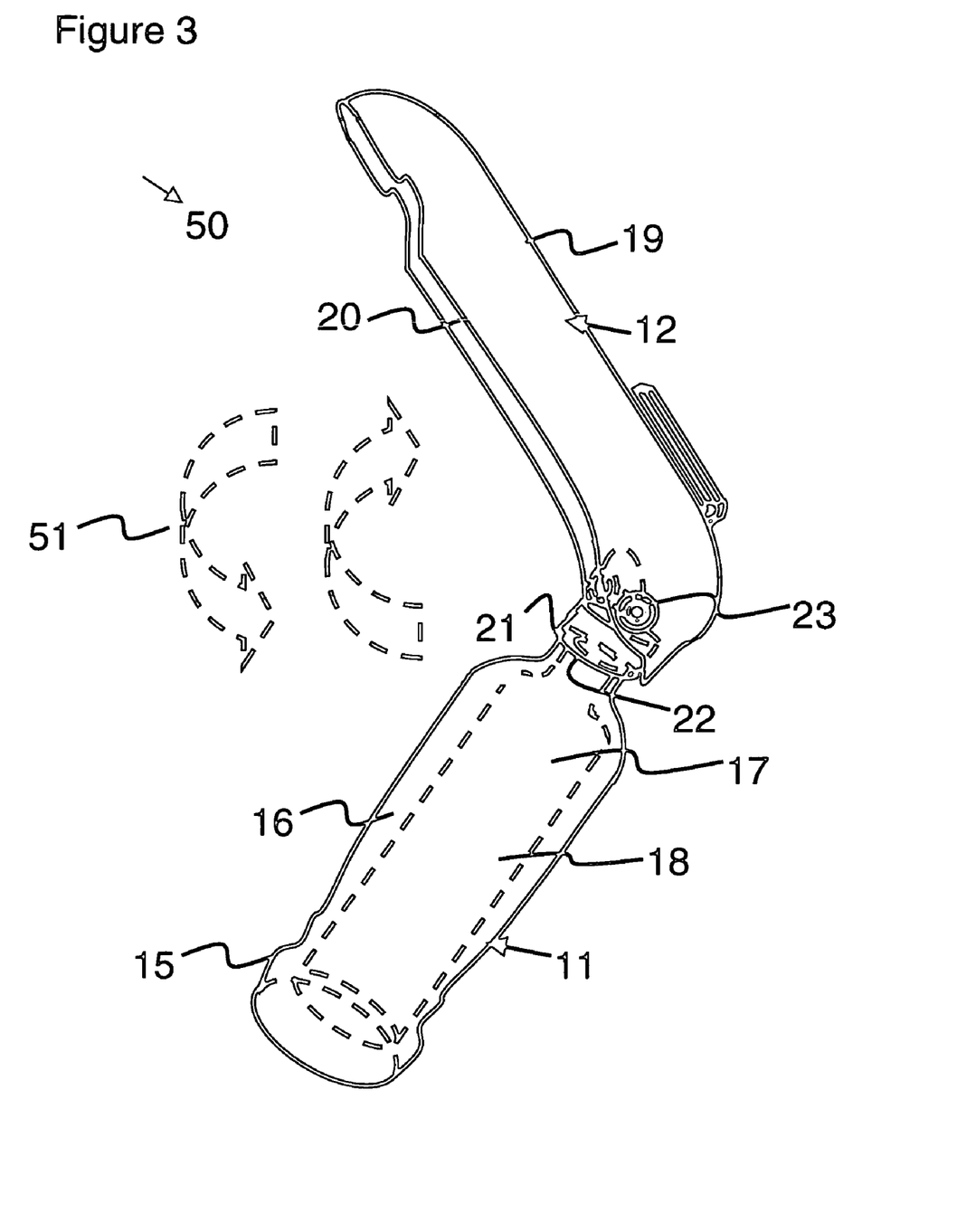
FIG. 3 is a schematic view of the bottle and delivery dish in the attached configuration illustrating the bottle pivotally removed from the interior compartment of the delivery dish.

FIG. 3 is a schematic view of the bottle and delivery dish in the attached configuration, illustrating the bottle pivotally removed from the interior compartment of the delivery dish yet still attached to the delivery dish, shown generally at 50. Bottle 11 pivots towards and away from delivery dish 12, depending on whether bottle 11 is being loaded into delivery dish 12 or being removed from delivery dish 12, respectively. Bottle 11 is removably attached to delivery dish 12 by way of top portion 13 being integrally connected to cap receiving portion 21 via orifice 22 of delivery dish 12, as discussed in FIG. 2 herein above. Bottle 11 further comprises a body portion 15 having an outer shell 16 and an internal chamber 17 appointed for receiving and housing a liquid 18 therein. The delivery dish 12 has an external casing 19 and an interior compartment 20 adapted to receive and removably house bottle 11 containing liquid 18. Delivery dish 12 is further adapted to receive and contain liquid 18 so that a human and/or a pet can drink from the delivery dish 12 after bottle 11 is removed there from. The interior compartment 20 of delivery dish 12 comprises a cap receiving member 21 having a receiving orifice 22 therein. The cap receiving member 21 is pivotally connected to a pivot means 23 so that the cap receiving member 21 is adapted to rotate or pivot back in forth in an outward and inward direction as indicated by the phantom arrows. The cap receiving member 21 is further adapted to removably connect to top portion 13 of bottle 11 when bottle 11 is attached to delivery dish 12. After attachment, the pivot means 23 rotates cap receiving member 21 and visa vie bottle 11 so that the body portion 15 of bottle 11 is housed within interior compartment 20 of delivery dish 12. Phantom arrow 51 illustrates the pivoting or rotation motion of the assembly.

Figure 4:
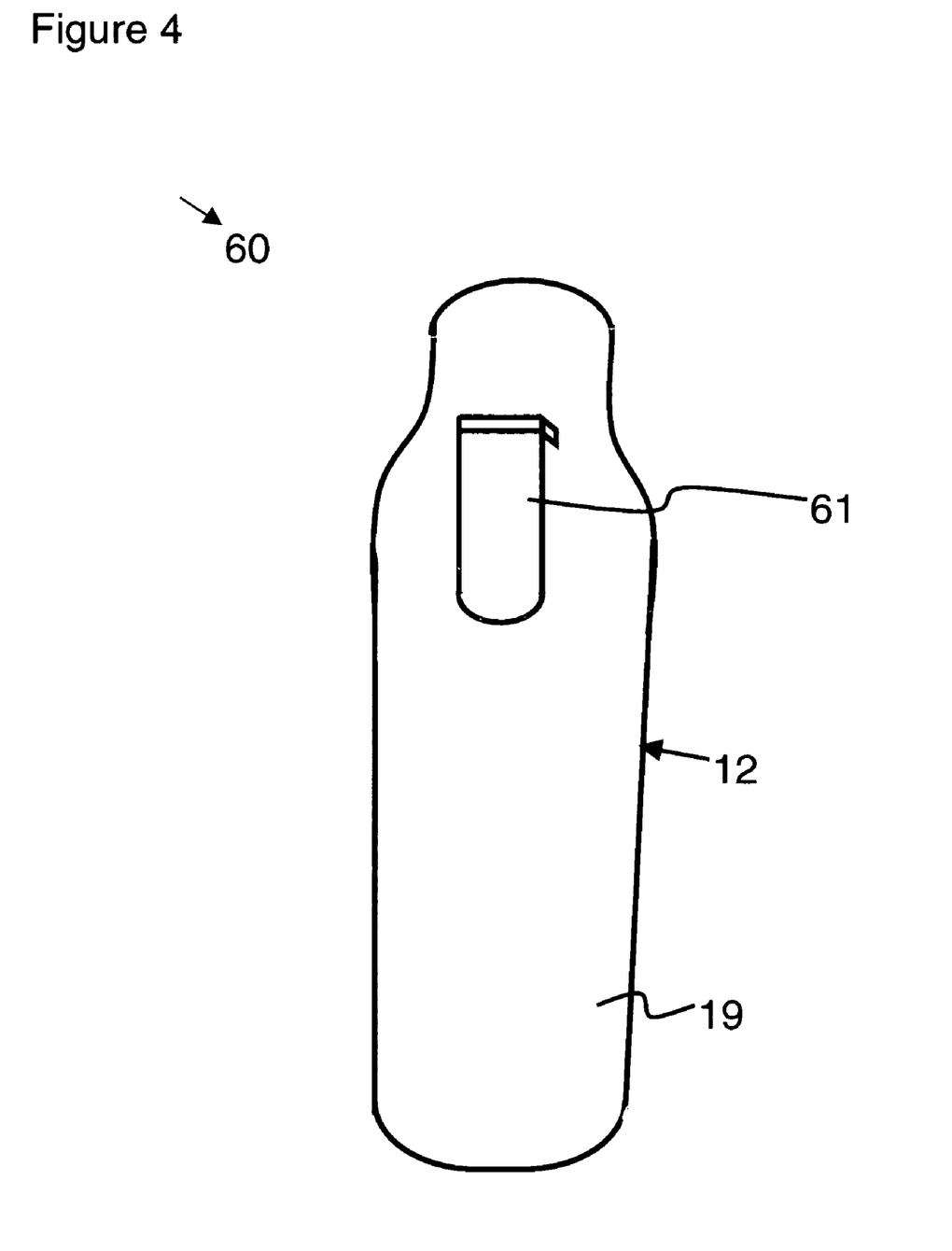
FIG. 4 is a schematic view of the back side of the delivery dish, illustrating the optionally attachment clip for ease in transportability of the Portable Water Bottle and Dish Assembly for Humans and Pets.

FIG. 4 is a schematic view of the back side of the delivery dish, illustrating the optional attachment clip for ease in transportability of the Portable Water Bottle and Dish Assembly for Humans and Pets, shown generally at 60. An attachment clip 61 may be included in the assembly. The attachment clip 61 is located on the external casing 19 of delivery dish 12. Also, although not illustrated in the figures, the outer shell 16 of bottle 11 may further comprise a grip portion appointed for providing comfort to the human when holding the bottle. This grip portion may comprise a plurality of contour curves and can be composed of foam, sponge, plastic, or rubber material.

The portable water bottle and dish assembly may include a second bottle adapted to be removably housed within delivery dish 12 and being appointed to accommodate interchangeability of bottle 11 with the second bottle. Like the main bottle 11, the second may have an insulated construction adapted to insulate liquid 18 housed therein.

The present invention also provides a method of delivering water by way of a portable water bottle and dish assembly to a pet or human. Please refer to FIG. 1 for clarity. The method includes the first step of filling bottle 11 with liquid 18, wherein bottle 11 comprises a top portion 13 with an aperture 14 and a body portion 15 having an outer shell 16 and an internal chamber 17 appointed for receiving and housing a liquid 18 therein. Secondly, top portion 13 of bottle 11 is then placed within a receiving orifice 22 of a cap receiving member 21 found within an interior compartment 20 of a delivery dish 12. The cap receiving member 21 is pivotally connected to a pivot means 23 adapted to rotate the cap receiving member 21 and the bottle 11. The delivery dish 12 further comprises an external casing 19. Thirdly, the bottle 11 and the cap receiving member 21 are rotated in an inward direction so that the body portion 15 of the bottle 11 is removably housed within the interior compartment 20 of the delivery dish 12. Fourthly, the delivery dish and bottle assembly 10, containing liquid 18 housed therein, is carried until the pet or human experiences thirst. Fifthly, the body portion 15 of bottle 11 is snapped out of interior compartment 20 of delivery dish 12. Sixthly, bottle 11 and the cap receiving member 21 are rotated in an outward direction so that the bottle 11 is removed from the interior compartment 20 of the delivery dish 12. Seventhly, the top portion 13 of the bottle 11 is removed from the receiving orifice 22 of the cap receiving member 21 of the delivery dish 12. Finally, the liquid 18 is poured into the interior compartment 20 of the delivery dish 12 so that the human and/or the pet can drink from the delivery dish.

In the method embodiment, the internal chamber 17 of bottle 11 may be an insulating internal chamber adapted to insulate the liquid 18 housed therein. Optionally, the interior compartment 20 of the delivery dish 12 is an insulating interior compartment adapted to insulate the liquid 18 housed in bottle 11 when bottle 11 is within interior compartment 20 of delivery dish 12.

The delivery dish 12 can be in an array of shapes and sizes, in conformance with the bottle's 11 shape and size. The delivery dish 12 closes over bottle 11 for compact storage, comfort, and for use when the liquid 18 housed within the bottle 11 is being consumed. The delivery dish 12 is removed from the bottle 11 when the bottle 11 is opened, as the delivery dish 12 is integrally attached to the bottle 11 at a top portion 13 via cap receiving portion 21. The delivery dish 12 may be removed for cleaning, or when in use, for delivering the liquid 18 to a human or pet.

The delivery dish 12 is composed of a light weight, durable plastic or metal material; preferably plastic or light weight stainless steel. The cap receiving portion 21 of delivery dish 12 removably houses a top portion 13 of bottle 11 and is also composed of a lightweight, durable plastic or metal material; preferably plastic or light weight stainless steel. The color, as well as the size, of the delivery dish 12 may vary. Optionally, the bottle 11 may be contoured to ergonomically mirror the human hand in order to facilitate a better grip. Furthermore, the contoured grip feature may have a foam or rubber surface in order to facilitate a better grip. Alternatively, the water bottle 11 may include a second non-insulated bottle that is not insulated. This second non-insulated bottle is configured so that the top dispenser portion thereof removably fits within the top closure portion of the delivery dish so that the non-insulated bottle is sealed shut. Moreover, the non-insulated bottle is configured in size and shape to fit within the interior compartment of the delivery dish so that the user can utilize either the thermos bottle or the non-insulated bottle. Alternatively, the delivery dish 12 is an insulated delivery dish comprising a lined interior made on the principle of the Dewar vessel for keeping liquids either hot or cold for several hours. The non-insulated bottle or the bottle 11 can be placed within the interior compartment 20 of the insulated delivery dish 12.

Having thus described the invention in rather full detail, it will be understood that such detail need not be strictly adhered to but that various changes and modifications may suggest themselves to one skilled in the art, all falling within the scope of the invention as defined by the subjoined claims.

What is claimed is:

1. A portable water bottle and dish assembly for humans and pets, comprising:
   a) a delivery dish;
   b) a bottle;
   c) said bottle removably housed within said delivery dish;
   d) said bottle comprising a top portion having an aperture and pour spout therein and a body portion having an outer shell and an internal chamber appointed for receiving and housing a liquid;
   e) said delivery dish having an external casing and an interior compartment adapted to receive and removably house said bottle and further adapted to receive and contain said liquid so that said human and said pet can drink from said delivery dish after said bottle is removed therefrom;
   f) said interior compartment of said delivery dish comprising a cap receiving member having a receiving orifice, said cap receiving member being adapted to removably connect said bottle to said delivery dish;
   g) said receiving orifice of said cap receiving member being adapted to removably receive and house said pour spout of said top portion of said water bottle when said water bottle is being housed within said delivery dish;
   h) an attachment clip located on said external casing of said delivery dish;
   i) said bottle being in a closed sealed position when said pour spout of said bottle is housed within said cap receiving member when connected to said delivery dish;
   j) said bottle being adapted to be manipulated to an open position via manual manipulation of said pour spout after removal of said bottle from said cap receiving member when disconnected from said delivery dish;
   k) said internal chamber of said bottle is an insulating internal chamber adapted to insulate said liquid;
   l) said interior compartment of said delivery dish is an insulating interior compartment adapted to insulate said liquid housed in said bottle when said bottle is within said interior compartment of said delivery dish;
   m) said outer shell of said bottle further comprises a grip portion appointed for providing comfort to said human when said human is holding said bottle;
   n) said grip portion comprises a plurality of contour curves, and said grip portion is composed of foam, sponge, plastic, or rubber material; and
   o) said body portion of said bottle further comprises a locking portion adapted to secure said bottle in said interior compartment of said delivery dish, said locking portion comprises at least one concave locking arc.

2. A portable water bottle and dish assembly as recited by claim 1, wherein said interior compartment of said delivery dish further comprises at least one convex securing member adapted to be received by the concave locking arc on said body portion of said bottle acting in concert to secure said bottle within said interior compartment of said delivery dish.

3. A portable water bottle and dish assembly as recited by claim 1, wherein said delivery dish comprises a fastening member adapted to secure said bottle in said interior compartment of said delivery dish.

4. A portable water bottle and dish assembly as recited by claim 3, wherein said fastening member of said delivery dish comprises a fastening strap having a fastening means.

5. A portable water bottle and dish assembly as recited by claim 4, wherein said fastening means is selected from the group consisting of hook and clasp closure, snap closure, a loop closure, and hook and loop fastener.

6. A portable water bottle and dish assembly as recited by claim 1, wherein said body portion of said bottle further comprises a release tab adapted to be utilized to release said body portion of said bottle from said interior compartment of said delivery dish.

7. A portable water bottle and dish assembly as recited by claim 1, wherein a second bottle adapted to be removably housed within said delivery dish and being appointed to accommodate interchangeability of said bottle with said second bottle, said second bottle having an insulated construction adapted to insulate said liquid contained therein.

* * * * *